United States Patent
Pickard et al.

(10) Patent No.: US 10,901,440 B2
(45) Date of Patent: Jan. 26, 2021

(54) SYSTEM AND METHOD FOR OFFSETS WITHIN SCHEDULE GROUPS FOR MULTIPLE THERMOSTATS

(71) Applicant: Emerson Electric Co., St. Louis, MO (US)

(72) Inventors: Murray Ryan Pickard, Saint Ann, MO (US); Jeffrey N. Arensmeier, Fenton, MO (US); Abhishek Chakravarty, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 133 days.

(21) Appl. No.: 16/116,610

(22) Filed: Aug. 29, 2018

(65) Prior Publication Data
US 2020/0073419 A1 Mar. 5, 2020

(51) Int. Cl.
G05D 23/19 (2006.01)

(52) U.S. Cl.
CPC ..... *G05D 23/1917* (2013.01); *G05D 23/1923* (2013.01); *G05D 23/1928* (2013.01)

(58) Field of Classification Search
None
See application file for complete search history.

(56) References Cited

U.S. PATENT DOCUMENTS

| | | |
|---|---|---|
| 7,436,293 B2 | 10/2008 | Rourke et al. |
| 7,702,421 B2 | 4/2010 | Sullivan et al. |
| 9,476,657 B1 * | 10/2016 | Pettis ............... H05K 7/208 |
| 2009/0055760 A1 | 2/2009 | Whatcott et al. |
| 2009/0057425 A1 * | 3/2009 | Sullivan ............ G06F 30/13 236/51 |
| 2013/0067412 A1 | 3/2013 | Leonard et al. |
| 2015/0312995 A1 | 10/2015 | Bora et al. |
| 2016/0043962 A1 | 2/2016 | Kim et al. |
| 2018/0038606 A1 | 2/2018 | Chakravarty et al. |
| 2018/0129232 A1 | 5/2018 | Hriljac et al. |

* cited by examiner

*Primary Examiner* — Mohammad Ali
*Assistant Examiner* — Saad M Kabir
(74) *Attorney, Agent, or Firm* — Armstrong Teasdale LLP

(57) ABSTRACT

A multi-thermostat temperature control system and related methods include thermostats spaced about respective conditioning zones in conditioned spaces. The control system includes a thermostat controller configured to store a temperature setpoint value for each of the thermostats in an operating schedule. The thermostat controller is also configured to transmit a first control signal to the conditioning units to control an operation of the conditioning units to maintain a temperature of the conditioned spaces at a first respective temperature setpoint value and to receive offset values for respective ones of the thermostats wherein the one or more offset values are determined to counter the temperature effects of a local heat load in the conditioned spaces proximate an associated thermostat.

20 Claims, 7 Drawing Sheets

SYSTEM AND METHOD FOR OFFSETS WITHIN SCHEDULE GROUPS FOR MULTIPLE THERMOSTATS

BACKGROUND

This description relates to process control systems, and, more particularly, to managing operation of environmental conditioning equipment configured in groups.

Similar equipment grouped together to accomplish a similar task can sometimes be treated as individual components of a larger system that are controlled in concert. For example, a plurality of pumps or electrical generators are often commanded together as a unit, as if they were one larger piece of equipment. Such control can be a great benefit even if the equipment are not sized the same. However, certain conditions may arise that necessitate commanding one or more of the pieces of equipment differently than the others in the same group. Typically, this situation has required forming a separate group for the equipment needing to be treated differently and preparing a schedule for the new separate group having a small number of pieces of equipment in it. Having to generate new separate groups each time a piece of equipment needed to deviate its operation from the rest of the equipment in the group is time consuming, obviates the benefits of having groupings of equipment, and makes the operation of the equipment more prone to error.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one aspect, a multi-thermostat temperature control system includes a plurality of thermostats spaced about respective conditioning zones in one or more conditioned spaces. The thermostats are coupled to one or more conditioning units associated with the one or more conditioned spaces. The control system also includes a server environment having at least one processor, at least one memory device, and a communication interface communicatively coupled to the plurality of thermostats through a communication network. The control system further includes a thermostat controller having at least one processor, at least one memory device, and a communication interface communicatively coupled to the plurality of thermostats through the one or more communication networks. The thermostat controller is configured to store a temperature setpoint value for each of the plurality of thermostats in an operating schedule for a plurality of time periods wherein the operating schedule defines the temperature setpoint value for each of the plurality of time periods. The thermostat controller is also configured to transmit a first control signal to the one or more conditioning units to control an operation of the one or more conditioning units to maintain a temperature of the one or more conditioned spaces at a first respective temperature setpoint value and to receive one or more offset values for respective ones of the plurality of thermostats wherein the one or more offset values are determined to counter the temperature effects of a local heat load in the one or more conditioned spaces proximate an associated thermostat. The thermostat controller is further configured to transmit a second control signal to the one or more conditioning units to control an operation of the one or more conditioning units to maintain a temperature of the one or more conditioned spaces at a second respective temperature setpoint value.

In another aspect, a method of managing a plurality of thermostats associated with a plurality of conditioning units of a conditioned space is provided. Each thermostat of the plurality of thermostats is associated with a respective conditioning zone of the conditioned space wherein the conditioned space has a plurality of heat loads wherein the heat loads are positive or negative heat loads. The method includes operating the plurality of conditioning units based on an output of each thermostat of the plurality of thermostats to attempt to maintain a temperature of each conditioning zone of the conditioned space at a setpoint value stored in a memory device of the respective thermostat, receiving, by at least one thermostat of the plurality of thermostats, a setpoint offset value that modifies the output of the at least one thermostat a predetermined amount, and operating the plurality of conditioning units using the modified output of the at least one thermostat and an output of each other thermostat of the plurality of thermostats.

In yet another aspect, a temperature control system includes a communication network, a server environment comprising a processor, a memory, and a communication interface communicatively coupled to the one or more communication networks, and a plurality of thermostat devices physically positioned spaced apart in a single conditioned space or positioned in a plurality of conditioned spaces. Each of the plurality of thermostat devices including a network interface communicatively coupled to the server environment through the one or more communication networks, at least one temperature sensor for use in sensing an air temperature of a conditioned space, and a processing system including at least one processor communicatively coupled to at least one memory device. The processing system is configured to receive from the server environment, an operating schedule including an operating setpoint value for each of a plurality of selectable operating time periods, transmit a first operating control signal to an associated HVAC system comprising a plurality of conditioning units based on the operating schedule, and receive from the server environment, a setpoint offset value schedule including a temperature offset from the operating setpoint value for each of a plurality of selectable offset time periods. The processing system is also configured to transmit a second operating control signal to the associated HVAC system based on the operating schedule and the setpoint offset value schedule, and operate the associated HVAC system using the second operating control signal.

Various refinements exist of the features noted above in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE DRAWINGS

FIG. 1 is a schematic block diagram of a multi-thermostat temperature control system in accordance with an example embodiment of the present disclosure.

FIG. 2 is a graph illustrating a relationship between the operating schedule and the offset values for the plurality of thermostats.

FIG. 3 is a graph of an individual thermostat setpoint value with respect to time as modified by operating schedule and/or setpoint offset value schedule on in accordance with an example embodiment of the present disclosure.

FIG. 4 is a flow diagram of a process of scheduling setpoints in a temperature control system.

FIG. 5 is a diagram of example the computing devices and that may be used in the multi-thermostat temperature control system shown in FIG. 1.

FIG. 6 is a display of the operating schedule, shown in FIG. 1, which may be used with multi-thermostat temperature control system shown in FIG. 1.

FIG. 7 is a display of an individual thermostat setpoint offset value input block that may be used with the multi-thermostat temperature control system shown in FIG. 1.

Figure 1:
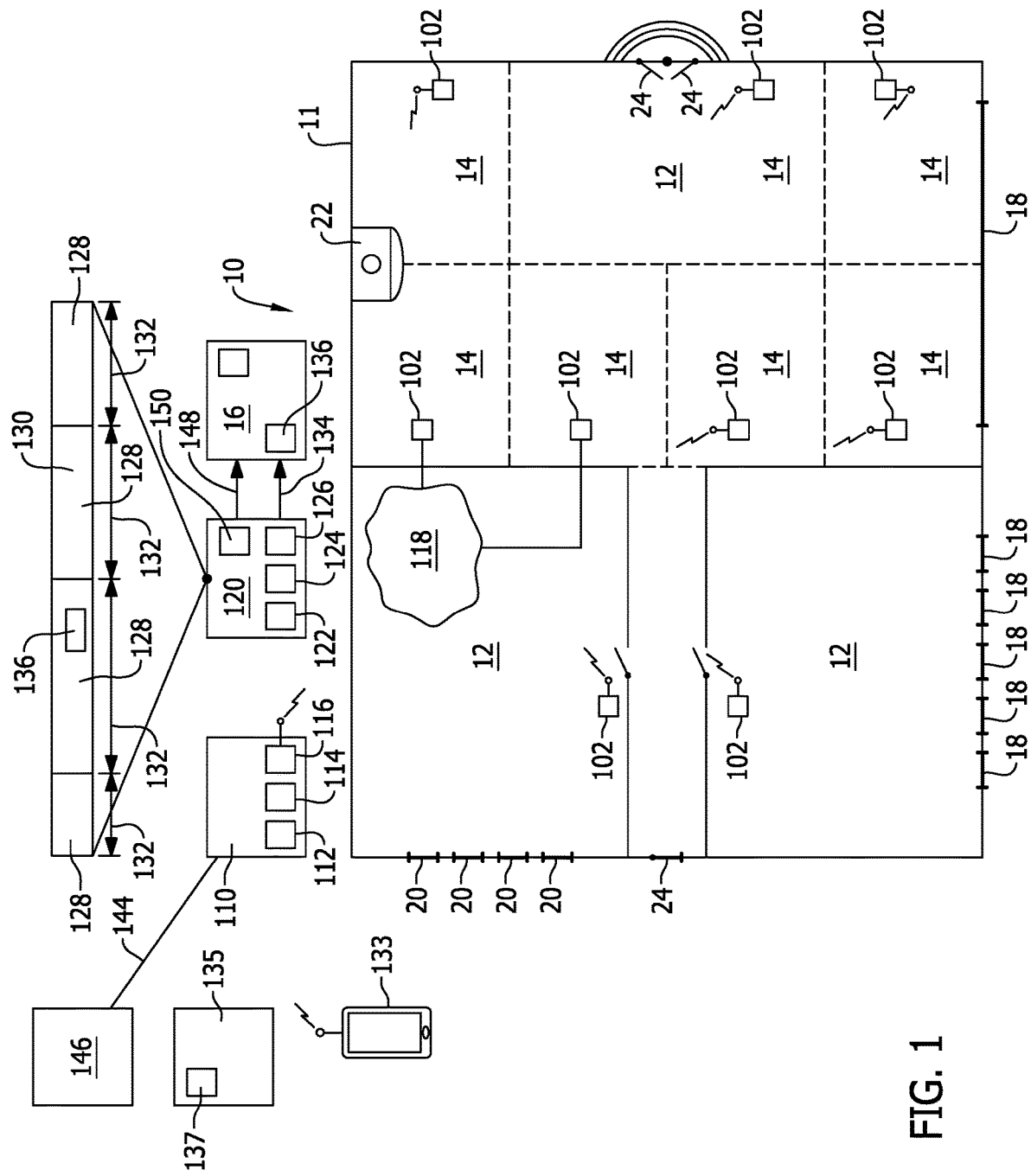
FIGS. 1-7 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to analytical and methodical embodiments of managing multi-thermostat temperature control systems in industrial, commercial, and residential applications.

Embodiments of a multi-thermostat temperature control system are described herein. The multi-thermostat temperature control system may be used, for example, on a school campus, or on small to medium industrial, manufacturing, or commercial entities. Illustrating an embodiment, all the thermostats in dining area may be configured in the same group of a plurality of groups of thermostats. Each group typically has a plurality of thermostats. There is a desire to have the thermostats in kitchen area operate 5° cooler than other thermostats in the dining area group during heating operation and be set 8° cooler during cooling operation. There is also a small area within the dining area where there is a desire to have the heat 3° warmer than the rest of the area while in heating operation and no offset during cooling operation. Desire is to have them all in the same group running on the same schedule, just particular thermostats running at a different offset from the group as a whole.

Accordingly, the multi-thermostat temperature control system may be in situations where some of the grouped thermostats are located next to a local heat source or cooling source. For example, a real-world situation in which a thermostat is located between two curing ovens in a manufacturing environment.

In various embodiments, the HVAC controller may maintain in its memory an operating schedule that may be used to control the HVAC system based upon time and/or day. The operating schedule may, for example, be a daily programmable schedule or any other schedule. In some cases, the operating schedule may have a number of days and one or more time periods for each of at least some of the days. In some instances, the nominal operating schedule may include an "occupied," an "unoccupied," and a "stand-by" time period for each of the days of a week. The operating schedule may have at least one set point associated with each of the one or more time periods. The operating schedule may be maintained in the memory, and may be modified by an end user in various embodiments.

Each thermostat may also be assigned an individual offset setpoint or schedule that permits it to operate differently than the rest of the thermostats in the group. The setpoint may be a constant offset that tracks the operating schedule but with a temperature differential from the operating schedule setpoints. The individual offset schedule may permit the thermostat to vary its differential from the operating schedule at different times during the period. The differential maintained by the individual offset schedule may vary over the course of the time period.

A method of managing a plurality of thermostats associated with a plurality of conditioning units of a conditioned space is also described herein. Each thermostat of the plurality of thermostats is associated with a respective conditioning zone of the conditioned space. The conditioned space may have one or more heat loads, which can be either positive or negative heat loads. The method includes operating the plurality of conditioning units based on an output of each thermostat of the plurality of thermostats to attempt to maintain a temperature of each conditioning zone of the conditioned space at a setpoint value stored in a memory device of the respective thermostat. The method also includes receiving, by at least one thermostat of the plurality of thermostats, a setpoint offset value that modifies the output of the at least one thermostat a predetermined amount and operating the plurality of conditioning units using the modified output of the at least one thermostat and an output of each other thermostat of the plurality of thermostats.

Optionally, the method of managing a plurality of thermostats also includes receiving a setpoint value for each thermostat of the plurality of thermostats and transmitting the setpoint value to a respective thermostat of the plurality of thermostats. Also optionally, the method can include receiving a setpoint offset value that modifies the output of the at least one thermostat an amount approximately equal to a temperature deviation from the setpoint value in the conditioning zone due to a heat load proximate the conditioning zone. In another optional embodiment, wherein the heat load includes an output indicating an operation of the heat load, the method of managing a plurality of thermostats may further include receiving an indication that the heat load is operating from the output, receiving a setpoint offset value that corresponds to the heat load operation, modifying the output of the at least one thermostat an amount equal to the received setpoint offset value, and operating the plurality of conditioning units using the modified output of the at least one thermostat and the output of each other thermostat of the plurality of thermostats.

The method of managing a plurality of thermostats also optionally includes receiving a setpoint offset value schedule that modifies the output of the at least one thermostat an amount defined by a schedule parameter. The method of managing a plurality of thermostats may also include receiving a setpoint offset value schedule that modifies the output of the at least one thermostat an amount defined by a schedule parameter that includes at least one of a time period and a flow of a process fluid. Additionally, the method of managing a plurality of thermostats can also include receiving one or more schedule parameters that includes at least one of a date, a time, a working schedule, a current weather, and a weather forecast.

The following description refers to the accompanying drawings, in which, in the absence of a contrary representation, the same numbers in different drawings represent similar elements.

FIG. 1 is a schematic block diagram of a multi-thermostat temperature control system 10 in accordance with an example embodiment of the present disclosure. In the example embodiment, multi-thermostat temperature control system 10 is operative to control temperatures in a structure 11 having a plurality of conditioned spaces 12, at least some of the conditioned spaces 12 having separately controlled zones 14. A temperature in structure 11 is maintained by one or more conditioning units 16, which may supply heat or cooling to the one or more conditioned spaces 12 and zones 14 when demanded by multi-thermostat temperature control system 10. Structure 11 may be characterized by certain features that may affect the ability of one or more conditioning units 16 to accurately maintain the temperature in the one or more conditioned spaces 12 and zones 14 at certain times. Such features may include south-facing windows 18 that can allow heat or cold to enter the one or more conditioned spaces 12 and zones 14 at different rates over the course of an entire day. Additionally, these rates may change day-to-day due to an occurrence of a weather-related event, such as, but not limited to, the position of the sun over the course of a day, the seasonal elevational changes of the sun, cloud cover, wind direction, and the like. West-facing windows 20 may also affect the ability of one or more conditioning units 16 to accurately maintain the temperature in the one or more conditioned spaces 12 and zones 14 at certain times. Although the mechanisms of the effects of west-facing windows 20 is similar to the effects of the south-facing windows, the timing of the effects and the magnitude of the effects may cause different influences on the ability of one or more conditioning units 16 to accurately maintain the temperature in the one or more conditioned spaces 12 and zones 14 at certain times. Other features include the presence and use or unuse of auxiliary heating devices, such as, but not limited to wood stoves, space heaters, and fireplaces 22, the presence of doors 24 and their use by visitors to structure 11.

In the example embodiment, multi-thermostat temperature control system 10 includes a plurality of thermostats 102 spaced about respective conditioning zones 14 in one or more conditioned spaces 12. The plurality of thermostats 102 form one or more groupings of thermostats having common control features. The plurality of thermostats 102 are communicatively coupled to one or more conditioning units 16 associated with the one or more conditioned spaces 12 and zones 14.

In some embodiments, a server environment 110 includes at least one processor 112, at least one memory device 114, and a communication interface 116 communicatively coupled to the plurality of thermostats 102 through a communication network 118, which may be a wired or wireless network, or a combination of wired and wireless networks 118. In other embodiments, server environment 110 is embodied in a peer-to-peer network, a central thermostat controller 120, or a cloud computing network.

Thermostat controller 120 includes at least one processor 122, at least one memory device 124, and a communication interface 126 communicatively coupled to the plurality of thermostats 102 through communication network 118. Thermostat controller 120 is configured to store a temperature setpoint value 128 for each of the plurality of thermostats 102 in an operating schedule 130 for a plurality of time periods 132.

One or more user access devices 133 may include any devices capable of receiving information from the network 118. The user access devices 133 could include general computing components and/or embedded systems optimized with specific components for performing specific tasks. Examples of user access devices include personal computers (e.g., desktop computers), mobile computing devices, cell phones, smart phones, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 133 can also include various other elements, such as processes running on various machines.

Network 118 may include any element or system that facilitates communications among and between various network nodes, such as elements 102, 110, 120 and 133. Network 118 may include one or more telecommunications networks, such as computer networks, telephone, or other communications networks, the Internet, etc. Network 118 may include a shared, public, or private data network encompassing a wide area (e.g., WAN) or local area (e.g., LAN). In some implementations, network 118 may facilitate data exchange by way of packet switching using the Internet Protocol (IP). Network 118 may facilitate wired and/or wireless connectivity and communication.

In various embodiments, multi-thermostat temperature control system 10 further includes a website 135 including one or more resources 137 (e.g., text, images, multimedia content, and programming elements, such as scripts) associated with a domain name and hosted by one or more servers. Resources 137 can be relatively static (e.g., as in a publisher's webpage) or dynamically generated in response to user query (e.g., as in a thermostat control webpage).

Operating schedule 130 defines the temperature setpoint value 128 for each of the plurality of time periods 132. Thermostat controller 120 is also configured to transmit a first control signal 134 to the one or more conditioning units 16 to control an operation of the one or more conditioning units 16 to maintain a temperature of the one or more conditioned spaces 12 and zones 14 at a first respective temperature setpoint value 136 of the stored temperature setpoint values 128. Thermostat controller 120 is further configured to receive one or more offset values 138 for respective ones of the plurality of thermostats 102. The one or more offset values 138 are determined to counter the temperature effects of a local heat load in the one or more conditioned spaces 12 proximate an associated thermostat 102. In various embodiments, the one or more offset values 138 are embodied in a setpoint offset value schedule 140. The setpoint offset value schedule 140 defines offset values 138 for at least some of the plurality of thermostats 102 with respect to time, operation of a local heat load, which may be a positive or negative heat load, and an occurrence of a weather-related event. In some embodiments, the one or more offset values 138 are manual inputs to thermostat 102 and/or thermostat controller 120 through a user interface 141. Thermostat controller 120 is also configured to transmit a second control signal to the one or more conditioning units 16 to control an operation of the one or more conditioning units 16 to maintain a temperature of the one or more conditioned spaces 12 at a second respective temperature setpoint value 142 of the stored temperature setpoint values 128.

The multi-thermostat temperature control system 10 is further configured to receive a demand side management (DSM) initiation signal 144, from server environment 110. DSM initiation signal 144 may originate with an electricity supplier 146 to reduce an electrical consumption of the one or more conditioning units 16. In some embodiments, DSM initiation signal 144 is used to modify at least one of the operating schedule 130 and the setpoint offset value schedule 140 based on DSM initiation signal 144. A DSM control signal 148 generated by thermostat controller 120 is transmitted to the one or more conditioning units 16 to control an operation of the one or more conditioning units 16 to maintain a temperature of the one or more conditioned spaces 12 at respective DSM temperature setpoint values 150.

Figure 2:
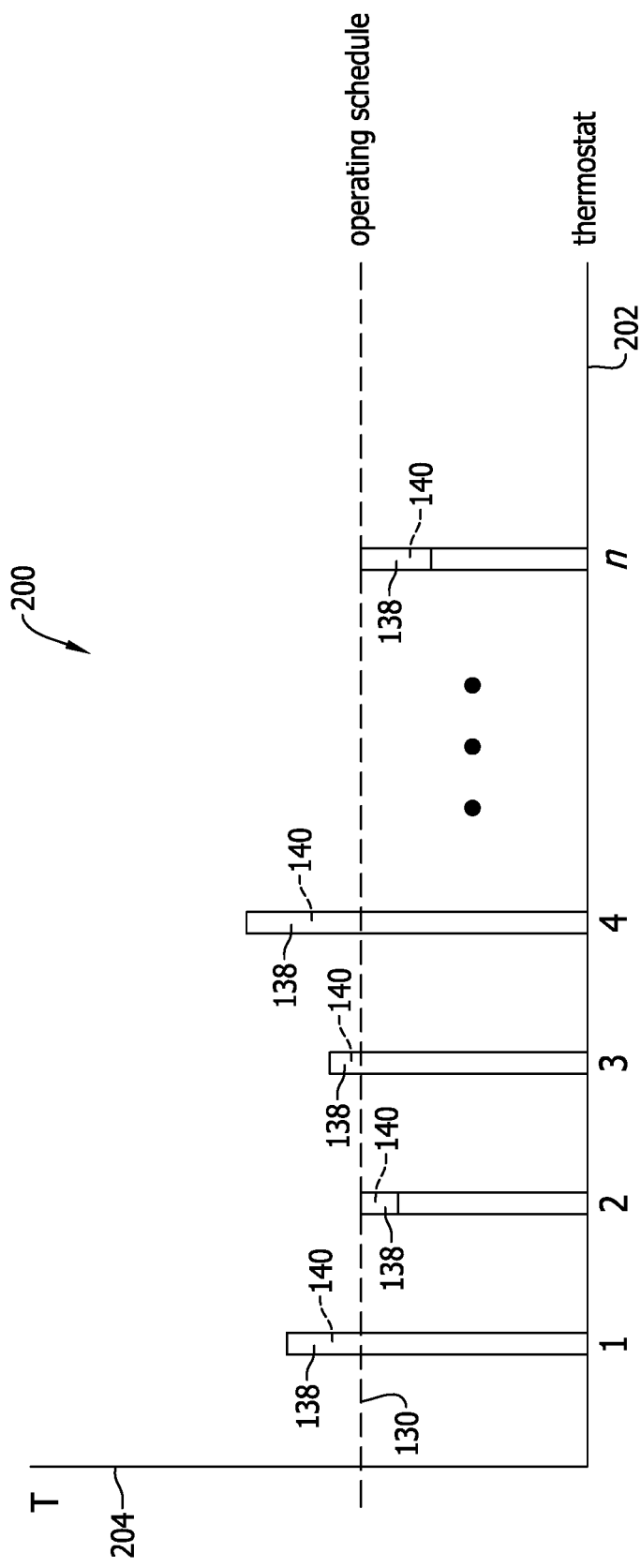

FIG. 2 is a graph 200 illustrating a relationship between operating schedule 130 and offset values 138 for the plurality of thermostats 102. Graph 200 includes an x-axis 202 graduated to illustrate setpoints and schedules associated with each thermostat 102 and a y-axis 204 graduated in units of temperature. In the example embodiment, operating schedule 130 is illustrated as assigning the same setpoint to all thermostats 102. However, operating schedule could schedule different temperatures for different thermostats 102 that would all change equally by the same amount when operating schedule 130 is adjusted by an operator. Because certain of the plurality thermostats 120 (1-$n$) are affected by heat loads in their respective areas different values of individual offsets may be assigned to each thermostat. For example, thermostat 1 in FIG. 2 may be affected by a positive heat load in its vicinity that makes its area warmer than what the operating schedule is attempting to command. The heat load in the vicinity of thermostat 1 could affect the temperature in its respective area two ways. The area could be colder than the operating schedule 130 is attempting to command because the heat load is inordinately affected the temperature sensed by thermostat 1, which turns of the call for heat in the area associated with thermostat 1. The heat added by the heat load may not be able to make up for the loss of heat due to thermostat 1 shutting off heating to the area because the temperature at the thermostat is higher than the setpoint set by operating schedule 130. In a case where the heat load affects the temperature of the area and the heat load adds heat to the area in addition in addition to the heat provided by conditioning unit 16.

Similarly, a heat load can be negative, meaning the heat load tends to make the area affected by it colder than is commanded by operating schedule 130 as shown in FIG. 2 in association with thermostat 2. Such a case might be presented by an open window or door during a winter season.

Operating schedule 130 moves all setpoints in the same direction and by the same amount and at the same time. Each thermostat 102 may be assigned a respective setpoint offset value schedule 140 that can move each thermostat 102 setpoint independent of any other thermostat 102 setpoint. The setpoint offset value schedule 140 may be a positive or negative offset depending on the net heat load in the area associated with the particular thermostat 102. Operating schedule 130 and/or setpoint offset value schedule 140 are also time dependent to account for known or scheduled activities the affect the heat being generated in each respective area. For example, setpoint offset value schedule 140 changes a respective one or more offset values 138 at different times during a predetermined time period. Setpoint offset value schedule 140 can be triggered to modify one or more offset values 138 based on time or may modify one or more offset values 138 based on a triggering event, such as, when a piece of equipment is started or secured. A kiln may be operated on a time schedule, which may be mimicked in setpoint offset value schedule 140 to provide adequate offsets for the kiln heat load added to one or more conditioned spaces 12 and zones 14. Alternatively, setpoint offset value schedule 140 may be triggered by a contact in a contactor associated with the kiln. When the contactor closes to energize the kiln, the contact also indicates to setpoint offset value schedule 140 to modify the associated one or more offset values 138 automatically.

Figure 3:
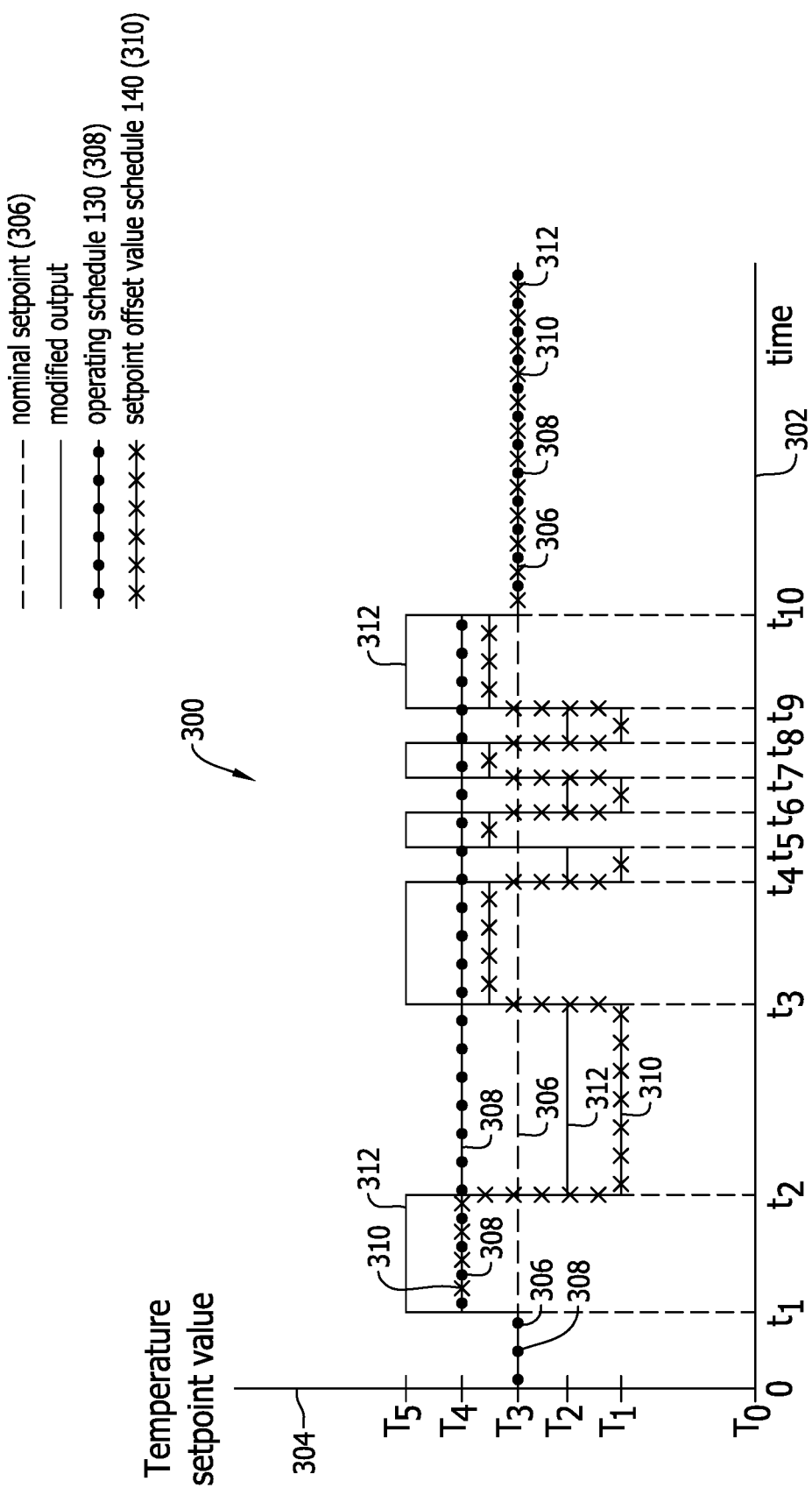

FIG. 3 is a graph 300 of an individual thermostat 120 setpoint value with respect to time as modified by operating schedule 130 and/or setpoint offset value schedule 140 on in accordance with an example embodiment of the present disclosure. Graph 300 includes an x-axis 302 graduated in units of time and a y-axis 304 graduated in units of degrees of thermostat setpoint value. In the example embodiment, a nominal setpoint trace 306 may be set at $T_3$ and remain constant over the course of time covered by graph 300. Operating schedule 130 may be represented by a trace 308. Operating schedule 130 affects all thermostats in the same group equally. Any setpoint changes commanded by operating schedule 130 will be implemented by all the thermostats in the affected group. For example, operating schedule 130 may simply be used to raise a temperature in a large area or a multi-room structure for work day comfort to $T_4$ at time $t_1$, which would coincide with a start time for the entity using the structure. Operating schedule 130 may maintain $T_4$ all day until for example, the end of the work day, when operating schedule 130 lowers the temperature in the structure back to $T_3$. Thus, operating schedule 130 may be used for a simple temperature evening setback for energy conservation.

A setpoint offset value schedule 140 trace 310 illustrates an individual temperature offset that is particular to a single thermostat 102. Setpoint offset value schedule 140 works in conjunction with operating schedule 130 to individualize a temperature setpoint for a single thermostat 102 that accounts for individual heat loads in an area covered by the respective thermostat. In this example, setpoint offset value schedule 140 is additive to operating schedule 130 with respect to the nominal setpoint illustrated by trace 306. The combination of operating schedule 130 and setpoint offset value schedule 140 provides a modified thermostat output signal illustrated by a trace 312. For example, between $t_1$ and $t_2$ operating schedule 130 and setpoint offset value schedule 140 both increase from $T_3$ to $T_4$. Because both operating schedule 130 and setpoint offset value schedule 140 modify the setpoint for the respective thermostat 102 their effect is additive and the resulting modified thermostat setting becomes $T_5$. Between $t_2$ and $t_3$, operating schedule 130 remains the same, but setpoint offset value schedule 140 drops down to $T_1$. The additive effect of the change in setpoint offset value schedule 140 is that the modified thermostat setpoint is reduced to $T_2$.

Figure 4:
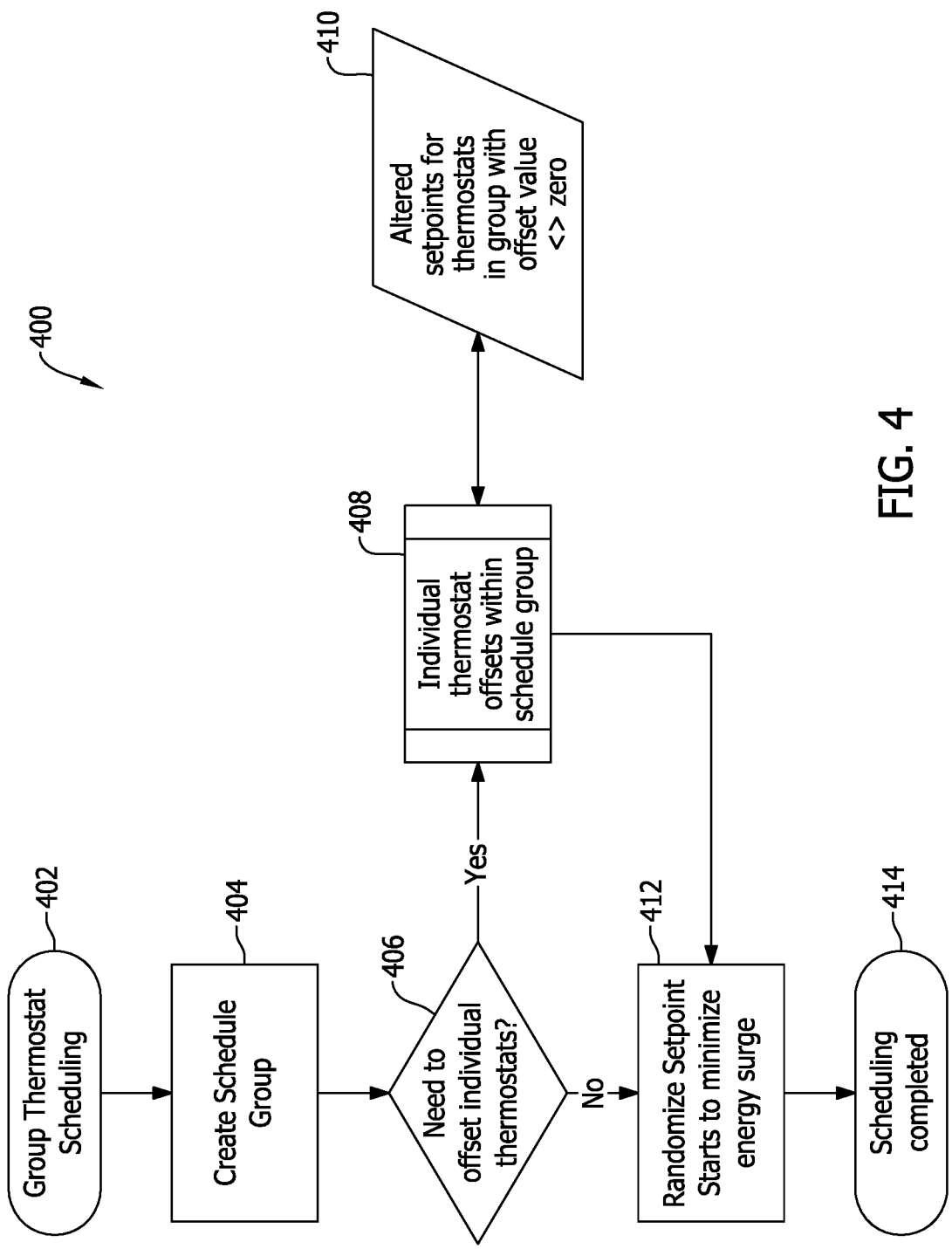

FIG. 4 is a flow diagram of a process 400 of scheduling setpoints in a temperature control system. In the example embodiment, process 400 begins when setting up group thermostat scheduling 402. A schedule group is created 404 by dragging and dropping a graphical representation of thermostat 102 from an ungrouped position on for example, a user interface, into a grouped position. It is determined 406 as to whether an offset is needed for individual thermostats 102 in the created schedule group. This determination may be conducted manually by a user or may be performed automatically by any of thermostats 102, or thermostat controller 120 or server environment 110 based on a profile of each space or zone affected by the respective thermostat 102. The profile may be derived by specifications for each positive and negative heat load and a schedule of operation for each of the heat loads. The profile may also be generated by the user using calculated heating of cooling effect values or using empirical or measured values. The profile and operation schedules of each of the loads are used to generate 408 an individual thermostat setpoint offset value for each thermostat. Alternately, or in addition to the individual thermostat setpoint offset value being generated 408, setpoint offset value schedule 140 may also be generated 408. The altered setpoint value is transmitted 410 to each affected thermostat 102. If the individual thermostat setpoint offset value is needed for individual thermostats 102 in the created schedule group or after the individual thermostat setpoint offset value or schedule has been generated, the process continues at block 412. In some instances, plurality of thermostats 102 may cause a large electrical surge if all or most of the conditioning units 16 are commanded to start simultaneously or near simultaneously. The process depicted in FIG. 4 may therefore stagger start, either randomly or by some other technique, conditioning units 16. In instances where starting surge has been determined to not be a problem, this step may be absent. Process 400 completes at step 414.

FIG. 4 is an example only and not intended to be restrictive. Other data flows may therefore occur in multi-thermostat temperature control system 10 and, even with data flow of process 400, the illustrated events and their particular order in time may vary. Further, the illustrated events may overlap and/or may exist in fewer steps. Moreover, certain events may not be present and additional and/or different events may be included. Any of the process steps may be embodied in computer code stored on non-transitory computer-readable media.

Figure 5:
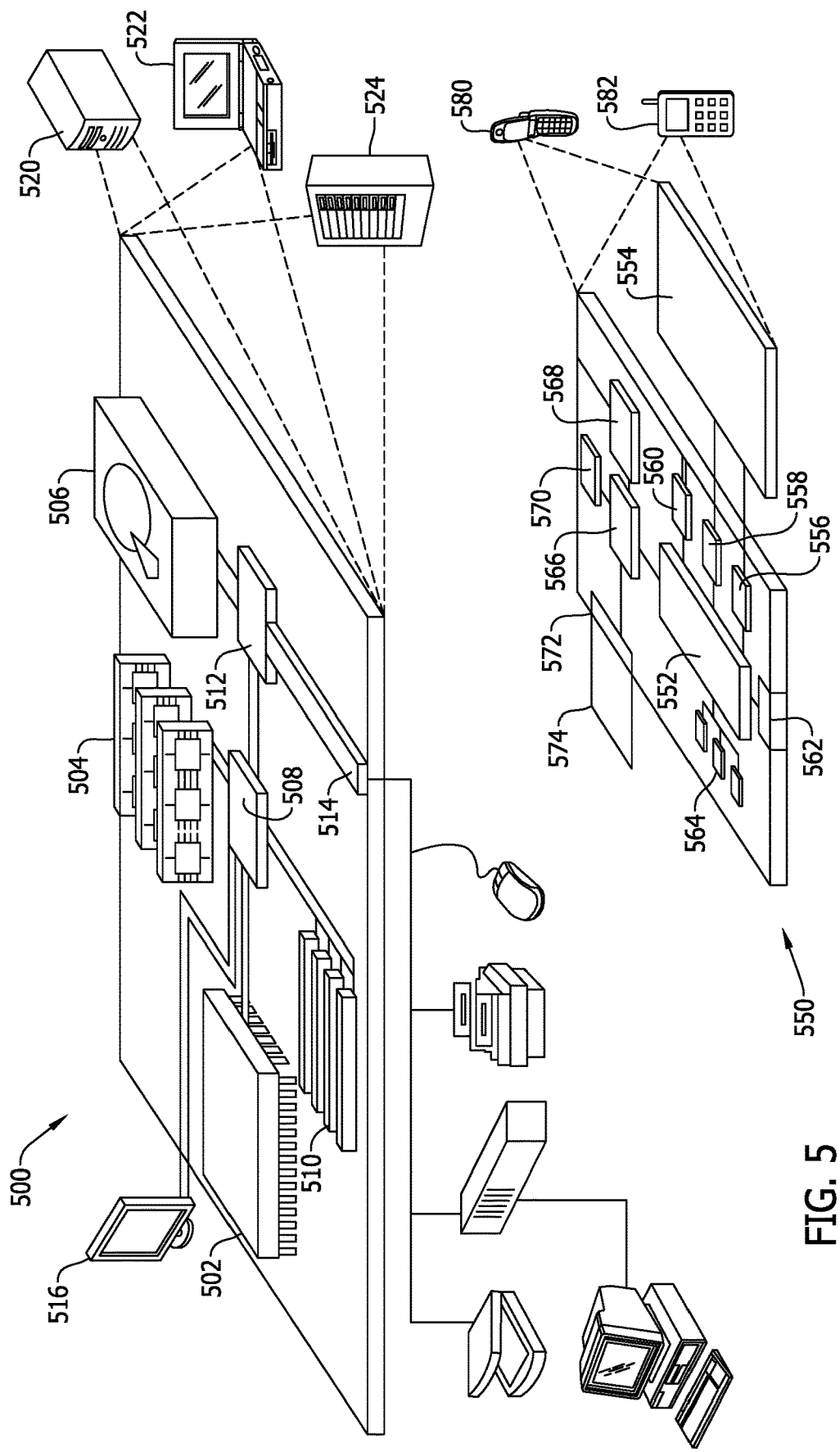

FIG. 5 is a diagram of example computing devices 500 and 550 that may be used in multi-thermostat temperature control system 10 shown in FIG. 1. More specifically, FIG. 5 shows an example of a computing device 500 and a mobile computing device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of user access devices 133 or mobile devices, such as personal digital assistants, cellular telephones, smart phones, and other similar computing devices. The components shown here, their connections and relationships, and their functions, are meant to be examples only, and are not meant to limit implementations of the disclosures described and/or claimed in this document.

Computing device 500 includes a processor 502, a memory 504, a storage device 506, a high-speed interface/controller 508 connecting to memory 504 and high-speed expansion ports 510, and a low speed interface/controller 512 connecting to a low-speed bus 514 and storage device 506. Each of components 502, 504, 506, 508, 510, and 512, are interconnected using various busses, and may be mounted on a common motherboard or in other manners as appropriate. Processor 502 can process instructions for execution within computing device 500, including instructions stored in memory 504 or on storage device 506 to display graphical information for a GUI on an external input/output device, such as display 516 coupled to high-speed interface/controller 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

Memory 504 stores information within computing device 500. In one implementation, memory 504 is a volatile memory unit or units. In another implementation, memory 504 is a non-volatile memory unit or units. Memory 504 may also be another form of computer-readable medium, such as a magnetic or optical disk.

Storage device 506 is capable of providing mass storage for computing device 500. In one implementation, storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as memory 504, storage device 506, or memory on processor 502.

High-speed interface/controller 508 manages bandwidth-intensive operations for computing device 500, while low speed interface/controller 512 manages lower bandwidth-intensive operations. Such allocation of functions is example only. In one implementation, high-speed interface/controller 508 is coupled to memory 504, display 516 (e.g., through a graphics processor or accelerator), and to high-speed expansion ports 510, which may accept various expansion cards (not shown). In the implementation, low speed interface/controller 512 is coupled to storage device 506 and low-speed buss 514. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

Computing device 500 may be implemented in a number of different forms, as shown in FIG. 5. For example, computing device 500 may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as computing device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. Computing device 550 may also be provided with a storage device, such as a microdrive or other device, to provide additional storage. Each of components 550, 552, 564, 554, 566, and 568, are interconnected using various buses, and several of the components may be mounted on a common motherboard or in other manners as appropriate.

Processor 552 can execute instructions within computing device 550, including instructions stored in memory 564. Processor 552 may be implemented as a chipset of chips that include separate and multiple analog and digital processors. Processor 552 may provide, for example, for coordination of the other components of computing device 550, such as control of user interfaces, applications run by computing device 550, and wireless communication by computing device 550.

Processor 552 may communicate with a user through control interface 558 and display interface 556 coupled to a display 554. Display 554 may be, for example, a TFT LCD (Thin-Film-Transistor Liquid Crystal Display) or an OLED (Organic Light Emitting Diode) display, or other appropriate display technology. Display interface 556 may comprise appropriate circuitry for driving display 554 to present graphical and other information to a user. Control interface 558 may receive commands from a user and convert them for submission to processor 552. In addition, an external interface 562 may be in communication with processor 552, so as to enable near area communication of computing device 550 with other devices. External interface 562 may provide, for example, for wired communication in some implementations, or for wireless communication in other implementations, and multiple interfaces may also be used.

Memory 564 stores information within computing device 550. Memory 564 can be implemented as one or more of a computer-readable medium or media, a volatile memory unit or units, or a non-volatile memory unit or units. Expansion memory 574 may also be provided and connected to computing device 550 through expansion interface 572, which may include, for example, a SIMM (Single In Line Memory Module) card interface. Such expansion memory 574 may provide extra storage space for computing device 550, or may also store applications or other information for computing device 550. Specifically, expansion memory 574 may include instructions to carry out or supplement the processes described above, and may include secure information also. Thus, for example, expansion memory 574 may be provided as a security module for computing device 550, and may be programmed with instructions that permit secure use of computing device 550. In addition, secure applications may be provided via the SIMM cards, along with additional information, such as placing identifying information on the SIMM card in a non-hackable manner.

Memory 564 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as memory 564, expansion memory 574, or memory on processor 552 that may be received, for example, over transceiver 568 or external interface 562.

Computing device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth®, Wi-Fi, or other such transceiver (not shown). In addition, GPS (Global Positioning system) receiver module 570 may provide additional navigation- and location-related wireless data to computing device 550, which may be used as appropriate by applications running on computing device 550.

Computing device 550 may also communicate audibly using audio codec 560, which may receive spoken information from a user and convert it to usable digital information. Audio codec 560 may likewise generate audible sound for a user, such as through a speaker, e.g., in a handset of computing device 550. Such sound may include sound from voice telephone calls, may include recorded sound (e.g., voice messages, music files, etc.), and may also include sound generated by applications operating on computing device 550.

Computing device 550 may be implemented in a number of different forms, as shown in FIG. 5. For example, it may be implemented as a cellular telephone 580. It may also be implemented as part of a smart phone 582, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 500 and 550 are configured to receive and/or retrieve data pertaining to the control of HVAC equipment, from various other computing devices connected to computing devices 500 and 550 through, for example, communication network 118, and store this data within at least one of memory 504, storage device 506, and memory 564. Computing devices 500 and 550 are further configured to manage and organize the data within at least one of memory 504, storage device 506, and memory 564 using the techniques described herein.

Figure 6:
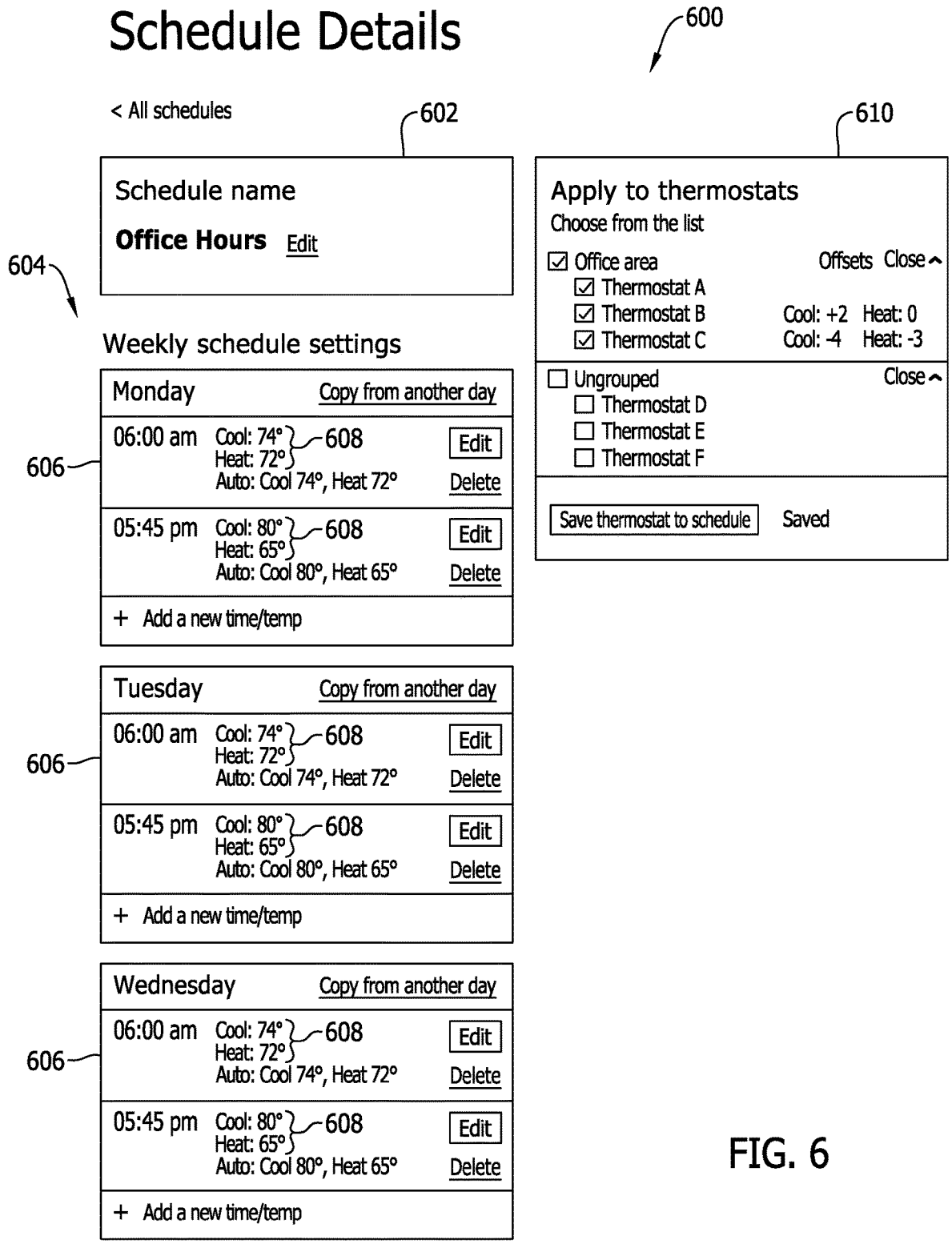

FIG. 6 is a display 600 of operating schedule 130 that may be used with multi-thermostat temperature control system 10 (shown in FIG. 1). In the example embodiment, display 600 includes a schedule name block 602, which permits identifying the parameters specified in operating schedule 130 as a single entity. A weekly schedule settings block 604 includes individual time period blocks 606, in this embodiment specified as daily blocks encompassing a 24 hour period associated with a calendar day. Although illustrated as having only three time periods, i.e., three days in weekly schedule settings block 604, any number of time periods may be specified and the time periods may be of uniform or different lengths. For example, instead of representing a day, each individual time period block 606 may represent a different time period, such as, but not limited to a shift, which can be any length of time. A shift may be 4, 6, 8, 12 hours long, or may be another length of time. A shift or other time period may not necessarily coincide with clock time, but with another event or activity occurrence.

Each of individual time period blocks 606 specifies heating and/or cooling setpoints 608 at specific times or at an occurrence of a specific event. Heating and/or cooling setpoints 608 may be specified as temperature setpoints, as illustrated, or by another parameter, for example, humidity.

Display 600 as illustrates a setpoint offset value schedule selection block 610. Different setpoint offset value schedules 140 may be predefined and be selectable in setpoint offset value schedule selection block 610. Some of the setpoint offset value schedules 140 may include grouped thermostats as well as thermostats 102 that are not grouped or are referred to as ungrouped.

Figure 7:
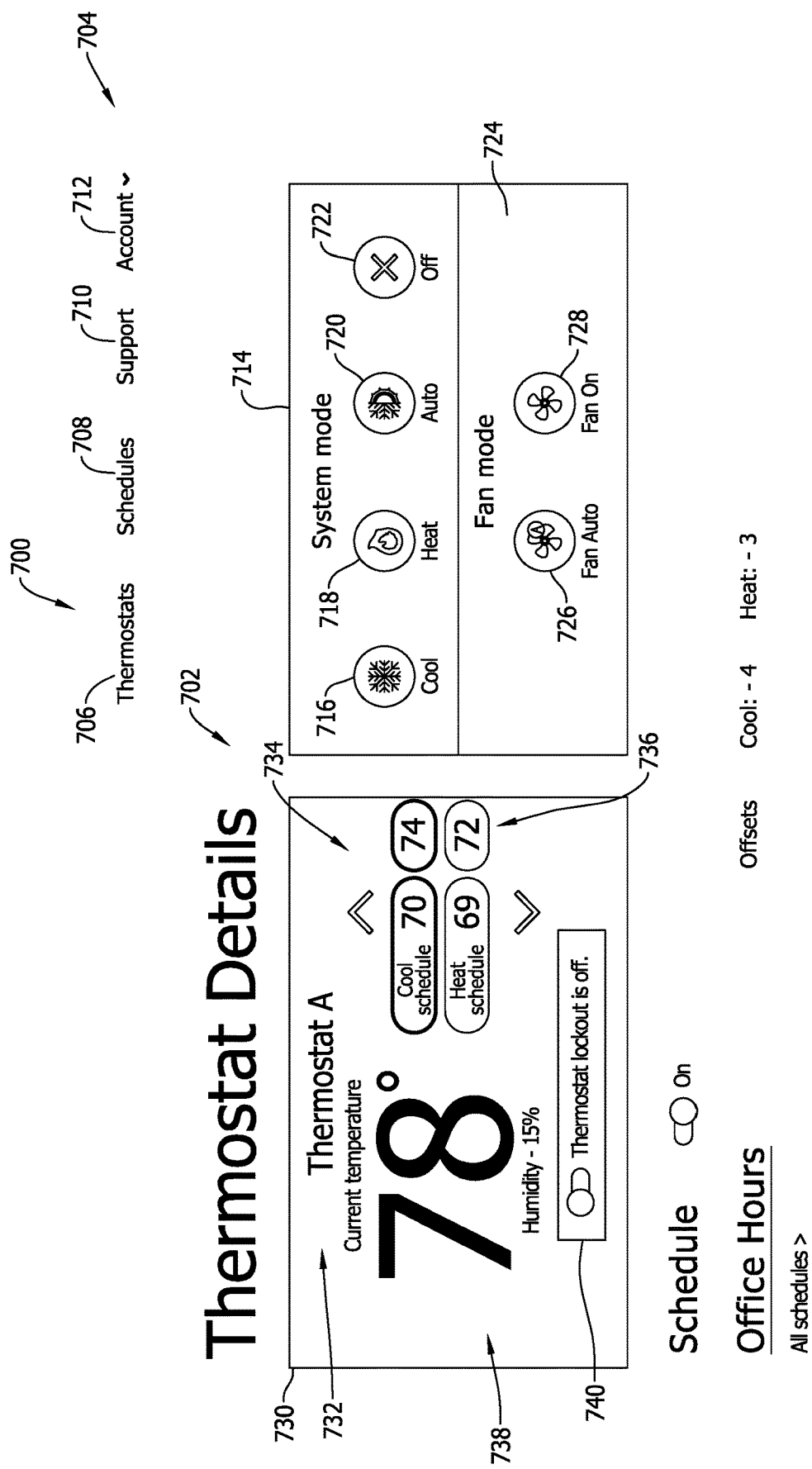

FIG. 7 is a display 700 of an individual thermostat setpoint offset value input block 702 that may be used with multi-thermostat temperature control system 10 (shown in FIG. 1). In the example embodiment, individual thermostat setpoint offset value input block 702 includes a menu bar 704 that includes a "Thermostats" 706 menu option, a "Schedules" 708 menu option, a "Support" 710 menu option, and an "Account" 712 menu option. Thermostats 706 menu option permits a user to select individual thermostats 102 or groups of thermostats 102 to modify the settings of Schedules 708 menu option permits a user to select schedules to edit or select for operation. Support 710 menu option and Account 712 menu option permit the user to request help with multi-thermostat temperature control system 10 or to manage accounts associated with multi-thermostat temperature control system 10.

A system mode block 714 displays a plurality of selections 716 that permit the user to select a cooling mode 718, a heating mode 720, an automatic mode 722, or an off mode 724. Individual thermostat setpoint offset value input block 702 also includes a Fan mode block 724 that includes selections for a "Fan Auto" mode 726, in which respective thermostat 102 controls the operation of the associated fan and a "Fan On" mode 728, in which the fan remains on regardless of the operation of the respective conditioning unit 16.

A current status block 730 permits a user to display a current status of each respective thermostat 102 of multi-thermostat temperature control system 10. In the example embodiment, current status block 730 includes a current schedule identifier 732. A current schedule setpoint display block 734 indicates a setpoint for cooling and heating modes of the current schedule. The individual thermostat setpoints are also displayed in a thermostat setpoint display block 736. A current measured parameter block 738 displays parameters that thermostat 102 is able to measure, calculate from measured and/or received parameters, and receive from other thermostats 102, server environment 110, thermostat controller 120, or any other source of displayable parameters. Status and/or warning messages may be displayed on a text and graphics window 740.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely one example, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the terms "user access device" and "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

While the disclosure has been described in terms of various specific embodiments, it will be recognized that the disclosure can be practiced with modification within the spirit and scope of the claims.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 212 and by devices that include, without limitation, mobile devices, clusters, personal computers, workstations, clients, and servers, including RAM memory, ROM memory, EPROM memory, EEPROM memory, and non-volatile RAM (NVRAM) memory. The above memory types are examples only, and are thus not limiting as to the types of memory usable for storage of a computer program.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.;

Microsoft is a registered trademark of Microsoft Corporation, Redmond, Wash.; and Sybase is a registered trademark of Sybase, Dublin, Calif.)

As will be appreciated based on the foregoing specification, the above-described embodiments of the disclosure may be implemented using computer programming or engineering techniques including computer software, firmware, hardware or any combination or subset thereof, the technical effect of the methods and systems may be achieved by performing at least one of the following steps: (a). Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link, including a cloud computing and/or storage environment. The article of manufacture containing the computer code may be made and/or used by executing the code directly from one medium, by copying the code from one medium to another medium, or by transmitting the code over a network.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A multi-thermostat temperature control system comprising:
    a group of thermostats including a plurality of thermostats spaced about respective conditioning zones in one or more conditioned spaces, the plurality of thermostats communicatively coupled to one or more conditioning units associated with the one or more conditioned spaces;
    a server environment comprising at least one processor, at least one memory device, and a communication interface communicatively coupled to the plurality of thermostats through one or more communication networks;
    a thermostat controller comprising at least one processor, at least one memory device, and a communication interface communicatively coupled to the plurality of thermostats through the one or more communication networks, the thermostat controller configured to:
        store a temperature setpoint value for the group of thermostats in an operating schedule for a plurality of time periods, the operating schedule defining the temperature setpoint value for all thermostats in the group of thermostats for each of the plurality of time periods;
        transmit a first control signal to the one or more conditioning units to control an operation of the one or more conditioning units to maintain a temperature of the one or more conditioned spaces at the temperature setpoint value;
        receive a temperature setpoint offset value for one of the thermostats within the group of thermostats, the temperature setpoint offset value determined to counter the temperature effects of a local heat load in the one or more conditioned spaces proximate the one of the thermostats within the group of thermostats; and
        transmit a second control signal to the one or more conditioning units to control an operation of the one or more conditioning units to maintain a temperature of the conditioned zone associated with the one of the thermostats within the group of thermostats to the temperature setpoint as adjusted by the temperature setpoint offset.

2. The multi-thermostat temperature control system of claim 1, wherein the setpoint offset value is embodied in a temperature setpoint offset value schedule, the temperature setpoint offset value schedule defining temperature setpoint offset values for at least some of the plurality of thermostats with respect to time, operation of the local heat load, and an occurrence of a weather-related event.

3. The multi-thermostat temperature control system of claim 2, the thermostat controller is further configured to:
    receive a demand side management (DSM) initiation signal, from the server environment, the DSM initiation signal configured to reduce an electrical consumption of the one or more conditioning units;
    modify at least one of the operating schedule and the temperature setpoint offset value schedule based on the DSM initiation signal; and
    transmit a DSM control signal generated by the thermostat controller to the one or more conditioning units to control an operation of the one or more conditioning units to maintain a temperature of the one or more conditioned spaces at respective DSM temperature setpoint values.

4. The multi-thermostat temperature control system of claim 1, wherein the temperature setpoint offset value is a manual input to the thermostat controller through a user interface.

5. The multi-thermostat temperature control system of claim 1, wherein the local heat load is at least one of positive and negative.

6. The multi-thermostat temperature control system of claim 1, wherein the one or more conditioning units comprises a plurality of conditioning units, and the thermostat controller is further configured to stagger starting of the plurality of conditioning units to facilitate reducing electrical surges when the conditioning units start.

7. A method of managing a group of thermostats, the group including a plurality of thermostats associated with a plurality of conditioning units of a conditioned space, each thermostat of the plurality of thermostats being associated with a respective conditioning zone of the conditioned space, the conditioned space having a plurality of heat loads, the heat loads being positive or negative heat loads, said method comprising:
    storing a temperature setpoint value for the group of thermostats in a memory of each thermostat of the group of thermostats in an operating schedule for a plurality of time periods, the operating schedule defining the temperature setpoint value for all thermostats in the group of thermostats for each of the plurality of time periods;
    operating the plurality of conditioning units based on a detected temperature of each thermostat of the group of thermostats to attempt to maintain a temperature of each conditioning zone of the conditioned space at the temperature setpoint value;

receiving, by one thermostat of the group of thermostats, a temperature setpoint offset value that modifies the temperature setpoint value of the one thermostat by a predetermined amount to counter the temperature effects of a local heat load in the conditioned zone associated with the one of thermostat; and operating the plurality of conditioning units based on the detected temperature of the one thermostat to attempt to maintain the temperature of the conditioning zone associated with the one thermostat at the temperature setpoint value as adjusted by the temperature setpoint offset.

8. The method of claim 7, further comprising:
receiving the temperature setpoint value for the group of thermostats including a plurality of thermostats; and
transmitting the temperature setpoint value to each thermostat in the group of the plurality of thermostats.

9. The method of claim 7, wherein receiving, by one thermostat of the group of thermostats, a temperature setpoint offset value that modifies the temperature setpoint value of the one thermostat by a predetermined amount comprises receiving a temperature setpoint offset value that modifies the temperature setpoint value of the one thermostat an amount equal to a temperature deviation from the setpoint value in the conditioning zone due to a heat load proximate the conditioning zone.

10. The method of claim 9, wherein the heat load includes an output indicating an operation of the heat load, said method further comprising:
receiving an indication that the heat load is operating from the output; and
receiving a temperature setpoint offset value that corresponds to the heat load operation.

11. The method of claim 7, wherein receiving, by one thermostat of the group of thermostats, a temperature setpoint offset value that modifies the temperature setpoint value of the one thermostat by a predetermined amount comprises receiving a temperature setpoint offset value schedule that modifies the temperature setpoint value of the one thermostat an amount defined by a schedule parameter.

12. The method of claim 11, wherein receiving a temperature setpoint offset value schedule that modifies the temperature setpoint value of the one thermostat an amount defined by a schedule parameter comprises receiving a temperature setpoint offset value schedule that modifies the temperature setpoint value of the one thermostat an amount defined by a schedule parameter that includes at least one of a time period and a flow of a process fluid.

13. The method of claim 11, further comprising receiving one or more schedule parameters that includes at least one of a date, a time, a working schedule, a current weather, and a weather forecast.

14. A temperature control system comprising:
one or more communication networks;
a server environment comprising a processor, a memory, and a communication interface communicatively coupled to the one or more communication networks;
a group of thermostats including a plurality of thermostat devices physically positioned spaced apart in a single conditioned space or positioned in a plurality of conditioned spaces, the conditioned space having a plurality of positive or negative heat loads, each thermostat comprising:
a network interface communicatively coupled to the server environment through the one or more communication networks;
at least one temperature sensor for use in sensing an air temperature of a conditioned space; and
a processing system comprising at least one processor communicatively coupled to at least one memory device, the processing system configured to:
receive from the server environment, an operating schedule including an operating setpoint value for all the thermostats in the group of thermostats, for a plurality of selectable operating time periods;
transmit a first operating control signal to an associated HVAC system comprising a plurality of conditioning units based on the operating schedule;
receive from the server environment, a temperature setpoint offset value schedule including a temperature offset from the operating setpoint value for one of the thermostat devices within the group of thermostats for a plurality of selectable offset time periods;
transmit a second operating control signal to the associated HVAC system based on the operating schedule and the temperature setpoint offset value schedule; and
operate the associated HVAC system using the second operating control signal.

15. The temperature control system of claim 14, wherein the processing system is further configured to:
receive a setpoint value for the group of thermostat devices including a plurality of thermostat devices; and
transmit the setpoint value to each of the thermostat devices of the plurality of thermostat devices.

16. The temperature control system of claim 14, wherein the processing system is further configured to receive a temperature setpoint offset value schedule that modifies an output of one thermostat device of the group of thermostats an amount equal to a detected temperature deviation from the setpoint value in a conditioning zone due to a heat load proximate the conditioning zone.

17. The temperature control system of claim 16, wherein the heat load includes an output indicating an operation of the heat load, said processing system is further configured to:
receive an indication that the heat load is operating from the output;
receive a temperature setpoint offset value that corresponds to the heat load operation;
modify an output of the one thermostat device an amount equal to the received temperature setpoint offset value; and
operate the plurality of conditioning units using the modified output of the one thermostat device and an output of each other thermostat device of the plurality of thermostat devices.

18. The temperature control system of claim 14, wherein the processing system is further configured to receive a temperature setpoint offset value schedule that modifies an output of the one of the plurality of thermostat devices an amount defined by a schedule parameter.

19. The temperature control system of claim 18, wherein the schedule parameter includes at least one of a time period and a flow of a process fluid.

20. The temperature control system of claim 18 wherein the schedule parameter includes at least one of a date, a time, a working schedule, a current weather, and a weather forecast.

* * * * *